United States Patent
Bischoff

(10) Patent No.: US 6,836,620 B1
(45) Date of Patent: Dec. 28, 2004

(54) METHOD FOR MONITORING THE SIGNAL QUALITY IN TRANSPARENT OPTICAL NETWORKS

(75) Inventor: Mathias Bischoff, München (DE)

(73) Assignee: Siemens Atkiengesellschaft, Munich (DE)

( * ) Notice: Subject to any disclaimer, the term of this patent is extended or adjusted under 35 U.S.C. 154(b) by 0 days.

(21) Appl. No.: 09/646,584
(22) PCT Filed: Mar. 19, 1999
(86) PCT No.: PCT/DE99/00800
§ 371 (c)(1), (2), (4) Date: Nov. 17, 2000
(87) PCT Pub. No.: WO99/48232
PCT Pub. Date: Sep. 23, 1999

(30) Foreign Application Priority Data
Mar. 19, 1998 (DE) .......................... 198 12 078

(51) Int. Cl.$^7$ ............................................. H04B 10/08
(52) U.S. Cl. ............................. 398/26; 398/25; 398/27; 398/33
(58) Field of Search ............................. 398/25, 26, 27, 398/33

(56) References Cited

U.S. PATENT DOCUMENTS

| 5,585,954 | A | | 12/1996 | Taga et al. | |
|---|---|---|---|---|---|
| 6,069,718 | A | * | 5/2000 | Khaleghi | ...................... 398/27 |
| 6,320,687 | B1 | * | 11/2001 | Ishikawa | .................... 398/147 |
| 6,396,601 | B1 | * | 5/2002 | Takara et al. | ................... 398/9 |

FOREIGN PATENT DOCUMENTS

DE          195 04 896          8/1996

OTHER PUBLICATIONS

Bergano et al, "Margin Measurements in Optical Amplifier Systems", *IEEE Photonics Technology Letters*, vol. 5, No. 3, Mar. 1993, pp. 304–306.
Press, "Numerical Recipes in Pascal", Cambridge University Press 1992, pp. 507–509.

* cited by examiner

*Primary Examiner*—Hanh Phan
(74) *Attorney, Agent, or Firm*—Bell Boyd & Lloyd LLC

(57) ABSTRACT

In order to monitor the signal quality in transparent optical transmission paths, the signal is sampled asynchronously, the distribution of the sample results in recorded and a signal quality parameter is formed, in that only those flanks which are located away from the maxima of the distribution are evaluated.

3 Claims, 3 Drawing Sheets

METHOD FOR MONITORING THE SIGNAL QUALITY IN TRANSPARENT OPTICAL NETWORKS

BACKGROUND OF THE INVENTION

The subject matter of the application relates to a method for monitoring the signal quality in transparent optical transmission paths, and the method asynchronously samples the signal, determines the position of the local maximum a for the low logic 0 and a maximum b for a high logic state 1, and determines a signal quality parameter Q from the distribution.

Such a method is disclosed in DE 195 04 896.

Optical networks on the basis of high bit rate, fiber-based transmission paths with optical switches and, possibly, also using optical frequency-division multiplex represent the future transport network for telecommunications. Already existing networks will be supported on this network, which will initially be installed as an overlay.

The further development to be expected with communications networks makes it necessary to design the optical networks to be as transparent as possible for their users. Various levels of transparency are possible in this case. It is thus necessary to distinguish whether a network is transparent with regard to the type of modulation, the line code, the clock frequency and/or the transmission format—that is to say, for example, the choice between a plesiochronous or synchronous digital hierarchy. A range of combinations are of practical importance in this case, with a network of maximum transparency being transparent with regard to type of modulation, line code, clock frequency and transmission format, with the type of modulation being defined for a lower level of transparency, with the freedom with regard to the line code also being lacking in an even lower transparency level, and with low transparency providing only freedom with regard to the transmission format.

The management of networks makes it necessary to monitor the transmission quality. In synchronous digital hierarchy networks or in ATM transmission networks, this function is provided by forming so-called bit interleaved parity (BIP), that is to say bit parity over a block of user data. The result of the parity calculation is in this case also transmitted in addition to the user data from the transmitter node to the receiver node where an assessment of the transmission quality and the identification of transmission errors are possible by comparing the newly calculated parity with the received value. However, this method is dependent on direct access to the user data being possible in each network node, which runs counter to the users' wishes for the greatest possible transparency in the transmission paths.

Apart from monitoring the transmission quality by investigating the bit parity, it is also known for at least one channel of an optical frequency-division multiplex signal to be reserved for monitoring purposes in each case. The information flows required for network management then run via this channel, with the parameters for this channel being reliably known, and with sufficient transmission capacity for test sequences generally being available. Although reliable information about the transmission quality of high-transparency networks is obtained in this way, this is dependent on the monitoring channel being representative of all the other transmission channels. The hypothesis that all the channels in an optical frequency-division multiplex system are affected equally by a disturbance is, however, not valid in many cases. Particularly in optical networks, there are a range of channel-selective disturbance sources, such as channel crosstalk, ripple from optical amplifiers, conversion of phase noise into amplitude noise on filter flanks, as well as other disturbance possibilities, so that the evaluation of a monitoring signal transmitted in a single channel need not necessarily provide reliable information about the transmission quality of the optical network. A further limitation to the validity of this method results from the fact that the monitoring channel is terminated in each optical switching apparatus by, a so-called cross connect switch, and does not pass through either a coupling network or a frequency converter and, based on the present level of knowledge, the frequency converter in particular has a critical influence on the signal quality.

In the method described in DE 195 04 896, amplitude samples are taken asynchronously with respect to the signal clock, and the central moments of the sample are calculated from these samples. These are then compared with empirically obtained reference values, and a statement relating to the signal quality is derived from this comparison. The sample evaluation by means of the moments is a method which is highly suitable provided the fundamental population on which the sample is based has a single-mode probability density function. However, this is not the case with the present problem.

Thus, in transparent optical networks, it is necessary to monitor the quality of the signals transported by the network without having to access payload-specific overhead information, since this would destroy the transparency.

SUMMARY OF THE INVENTION

The subject matter of the application is based on the problem of specifying a method for monitoring the signal quality in transparent optical transmission paths, by means of which it is firstly possible to make absolute statements on the signal quality and, furthermore, which is more sensitive.

For the subject matter outlined initially, this problem is solved by an improvement of determining at least one maximum of the two maxima just from values of the probability density function, which belong to a flank of the maximum which faces away from the other maximum.

The subject matter of the application makes use of the knowledge that the form of the function in the ranges s<a and s>b is independent of synchronous sampling or asynchronous sampling and provides an absolute statement about the signal quality and a high sensitivity, taking account of the bimodality of the probability density function of the amplitude samples.

The subject matter of the application will be explained in more detail in the following text as an exemplary embodiment and to an extent required for understanding, based on the following Figures.

DESCRIPTION OF THE PREFERRED EMBODIMENTS

In the figures, identical designations denote identical elements.

Figure 1:
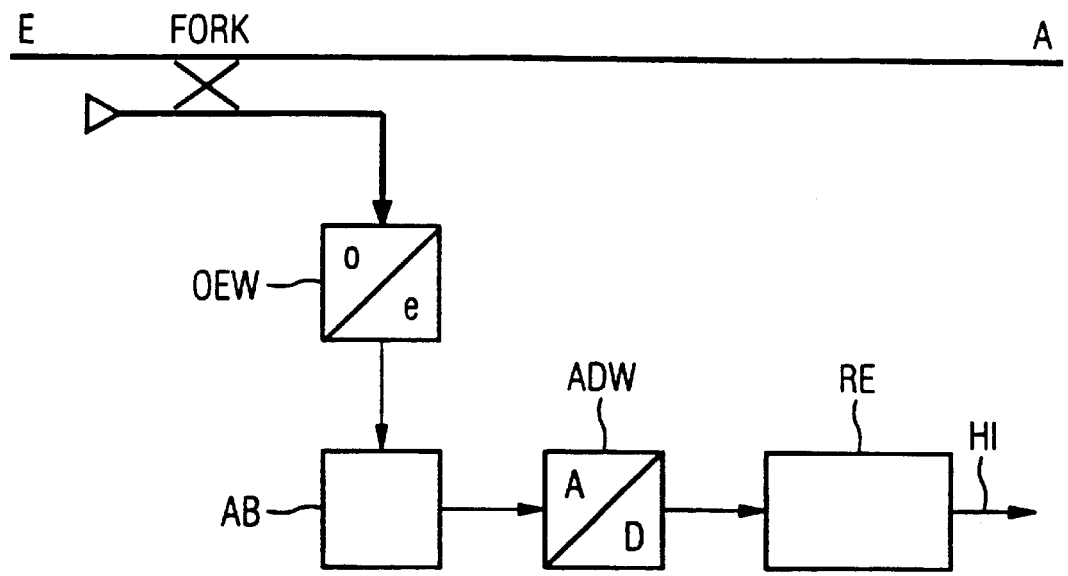
FIG. 1 shows an arrangement for carrying out the method according to the application.

In FIG. 1, a fiber-optic directional coupler FORK is introduced into the optical path between an input E and an output A, and a comparatively small proportion of the light power is output through this directional coupler FORK and is passed to the optical input of an optoelectronic transducer OEW. The optoelectronic transducer OEW, which may also include a photo current amplifier, passes a corresponding electrical output signal to an analog sampler AB, which operates on the sample-and-hold principle, and works at a signal frequency of 10 GHz with a clock frequency of 100 MHz which is not synchronized to the signal frequency. Such analog samplers are commercially available, for example, for sampling oscilloscopes. The input of an analog-digital converter ADW having a resolution of 8 bits, corresponding to 256 steps, is connected to the output of the sampler AB. The analog-digital converter ADW operates at the same clock frequency as the analog sampler AB and passes 8 bit words to the input of a computer RE in time with the 100 MHz clock, and this computer is being set up for statistical evaluation of such 8-bit words and contains a memory for reference values as well as an output device for the histograms HI which are produced. A precondition for the statistical evaluation in this case is that the signal to be investigated is intensity-modulated, and is transmitted using NRZ code. The precondition for statistical independence of the amplitude samples which are produced results firstly from the asynchronicity between the signal clock frequency and the sampling frequency, and secondly from the comparatively low sampling frequency, by means of which samples are reliably taken from mutually independent clock periods.

Figure 2:
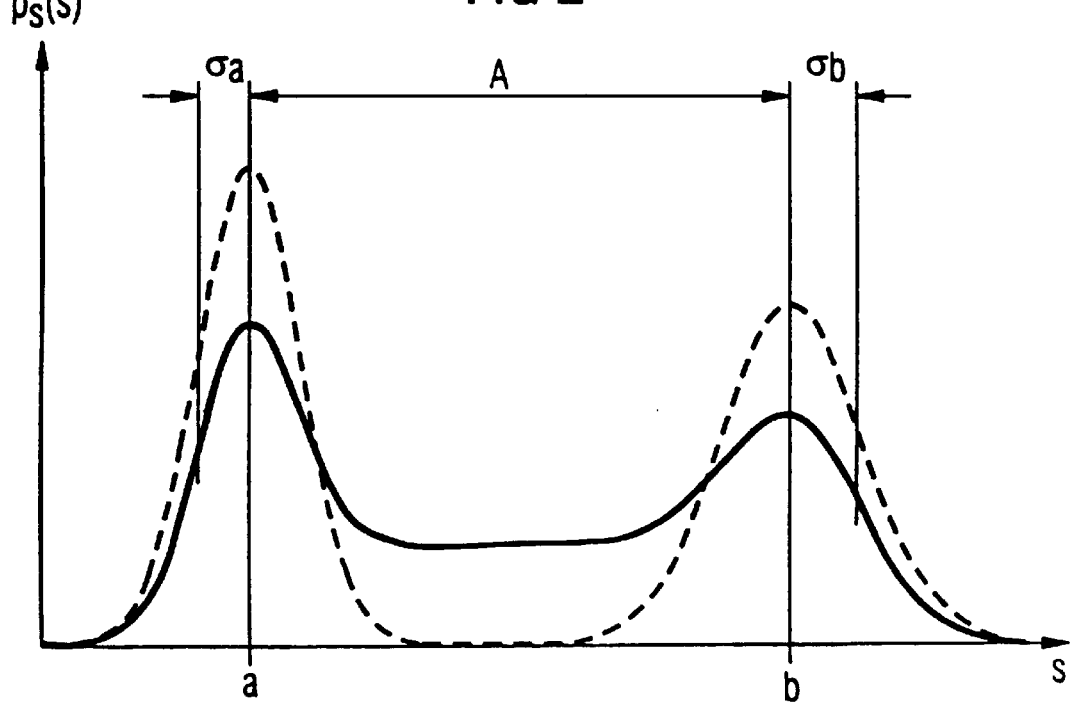
FIG. 2 shows the probability density function of the two states a=logic 0 and b=logic 1 of a binary signal, with a asynchronous sampling being shown by a solid line, and a synchronous sample being shown by a dashed line.

If the amplitude samples si are each taken at the bit center in synchronism with the data clock, this results, for the fundamental basic population, in a probability density function ps(s) as is outlined by a dashed line for binary signals in FIG. 2. The two binary states are represented by the amplitude values a and b, about which the noisy, actual amplitude values are distributed with the respective standard deviation sa or sb, respectively. A signal quality parameter Q, of a generally normal type, can be calculated from this probability density:

$$Q = \frac{A}{\sigma_a + \sigma_b} \quad (1)$$

In this case, A=b−a is the signal amplitude, and it is generally that a<b, without any limitation to. Since, in a transparent network, the amplitude samples can be taken only asynchronously with respect to the data clock, the profile shown by a solid line in FIG. 2 is obtained as the probability density function ps(s) for the basic population on which the sample is based. Since amplitude samples which originate from the flank area of the pulses are now also recorded, the density function is raised in the range a<s<b and leads to ps(s) no longer being symmetrical about a and b. However, the shape of the function is maintained in the regions s<a and s>b. This situation is exploited by the method described here. In detail, this method comprises the following steps:

(i) Take statistically independent amplitude samples si of the signal N.
(ii) Determine the positions of the local maxima a and b.
(iii) Calculate sa from the p samples for which s≦a:

$$\sigma_a = \sqrt{\frac{1}{p-1} \sum_{i=1}^{p} (s_1 - a)^2}$$

(iv) Calculate sb from the q samples for which si≧b:

$$\sigma_c = \sqrt{\frac{1}{q-1} \sum_{i=1}^{q} (s_i - b)^2}$$

(v) Calculate Q in accordance with (1) and output it.

Figure 3:
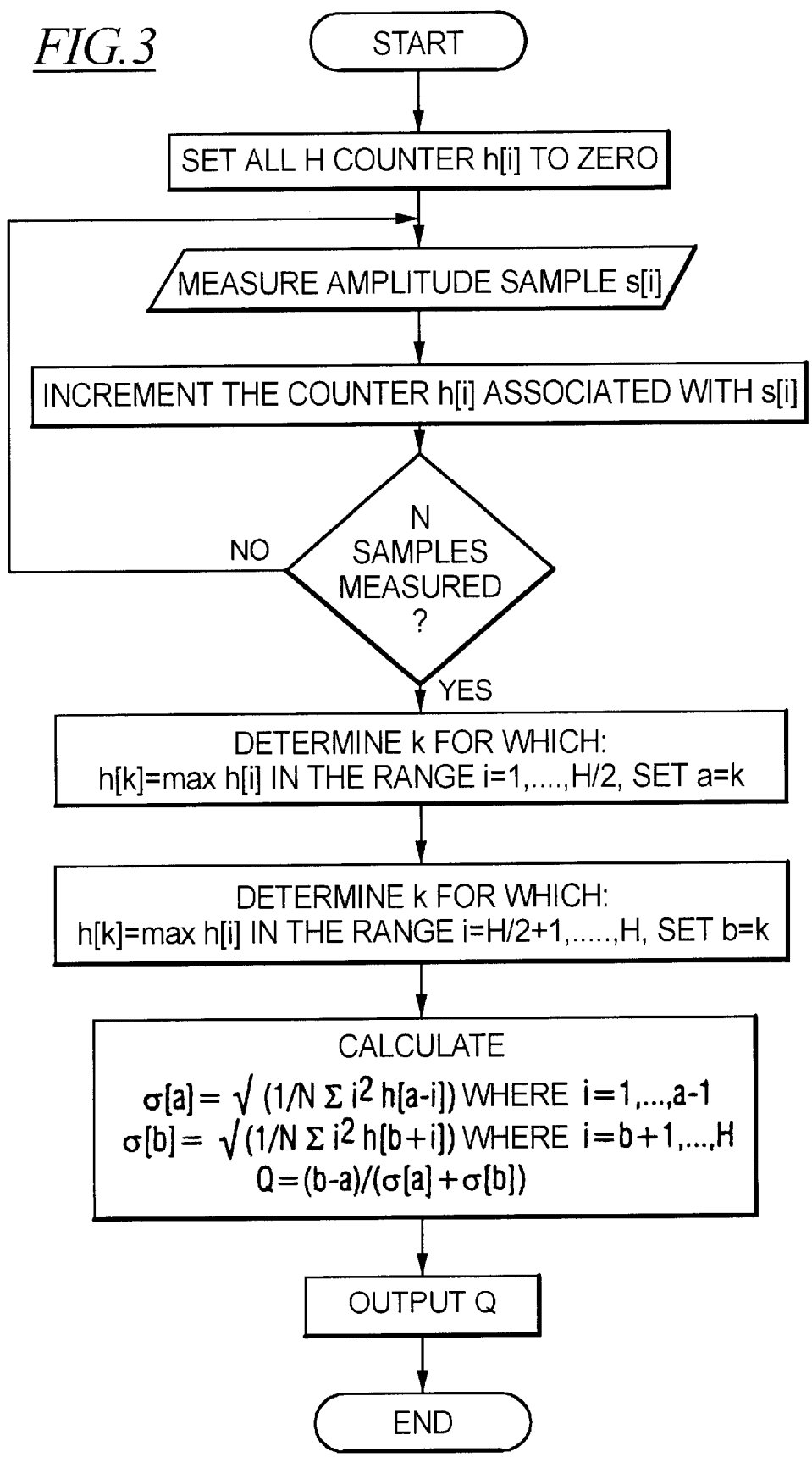
FIG. 3 shows a flowchart for evaluation according to the application of the probability density function for an asynchronously sampled binary signal.
Figure 4:
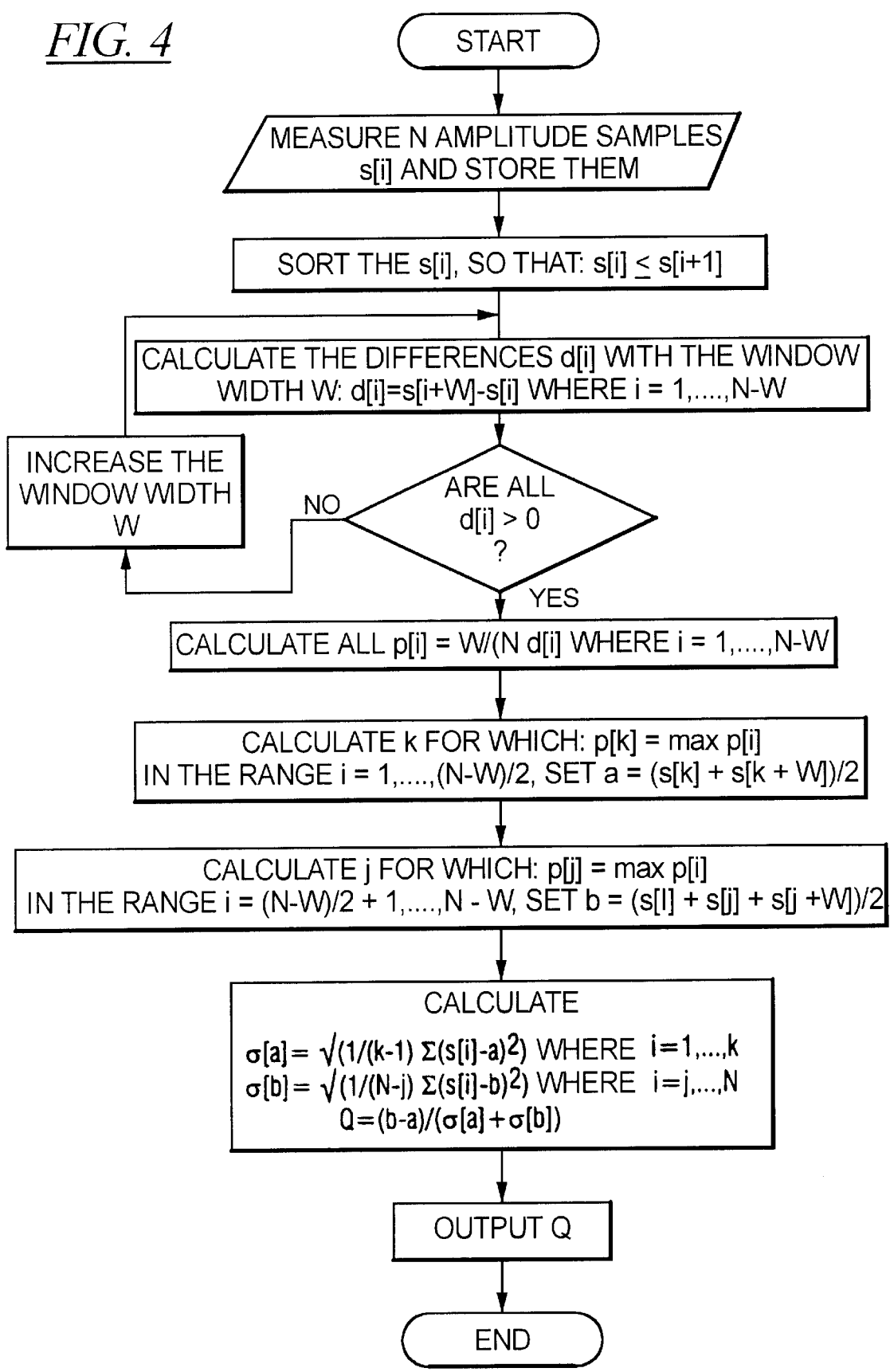
FIG. 4 shows a flowchart for further evaluation according to the application of the probability density function for an asynchronously sampled binary signal

FIG. 3 and FIG. 4 each show an exemplary embodiment in the form of a flowchart. With regard to the notation used there, it should be noted that variables in square brackets should be regarded as indices, that is to say $$x_i = x[i]$$

The exemplary embodiment in FIG. 3 is based on the production of a histogram and its subsequent evaluation for the purposes of the method described above. This is particularly suitable when an A/D converter with low resolution (8 bits) is used, and the sample size N is very large (for example N>10000).

For arrangements for taking samples which operate with high-resolution A/D converters (>12 bits) and with a moderate sample size, the histogram method is too inaccurate. In this case, the exemplary embodiment shown in FIG. 4 is more suitable. No histogram is produced in this case and the method searches for the two local maxima a and b by estimation of ps(s). The estimate can be obtained, for example, by the method of estimating the rate from an inhomogeneous Poisson process by means of J-tn waiting times as is known from Numerical recipes in Pascal, Numerical analysis, Applications of computer systems by Press William H., pages 507 . . . 509.

I claim:

1. A method for monitoring signal quality of a signal in a transparent optical transmission path, the method comprising:

sampling the signal asynchronously to obtain amplitude samples, wherein the signal is sampled at a substantially lower rate than a bit repetition rate of the signal;

determining positions of local maxima (a, b) in a probability density function (ps(s)) of the amplitude samples for a low logic state 0 denoted by "a" and for a high logic statement 1 denoted by "b";

determining a standard deviation (sa, sb) for at least one maximum (a, b) only from values of the probability density function belonging to a flank of the respective maximum facing away from the respective other maximum; and determining a signal quality parameter Q from the determined values.

2. A method for monitoring signal quality of a signal as claimed in claim 1, wherein, for both maxima (a, b), distributions are determined only for the flanks facing away from the respective one maximum (a, b) with respect to the respective other maximum (b, a).

3. A method for monitoring signal quality of a signal as claimed in claim 1, wherein a search for a maximum (a, b) is carried out via an estimate based on a known method of "estimation of the rate from an inhomogeneous Poisson process by means of J-tn weighting times."

* * * * *